(12) United States Patent
Ogata (10) Patent No.: US 12,130,453 B2
(45) Date of Patent: Oct. 29, 2024

(54) IMAGE DISPLAY DEVICE

(71) Applicant: KOITO MANUFACTURING CO., LTD., Tokyo (JP)

(72) Inventor: Yoichi Ogata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 397 days.

(21) Appl. No.: 17/616,266

(22) PCT Filed: Jun. 3, 2020

(86) PCT No.: PCT/JP2020/021993
§ 371 (c)(1),
(2) Date: Dec. 3, 2021

(87) PCT Pub. No.: WO2020/246516
PCT Pub. Date: Dec. 10, 2020

(65) Prior Publication Data
US 2022/0252900 A1  Aug. 11, 2022

(30) Foreign Application Priority Data

Jun. 5, 2019  (JP) ................ 2019-105128

(51) Int. Cl.
*G02B 30/36* (2020.01)
*G02B 27/10* (2006.01)
*G02B 30/35* (2020.01)

(52) U.S. Cl.
CPC .......... *G02B 30/36* (2020.01); *G02B 27/106* (2013.01); *G02B 30/35* (2020.01)

(58) Field of Classification Search
CPC ....... G02B 30/35; G02B 30/36; G02B 27/106
(Continued)

(56) References Cited

U.S. PATENT DOCUMENTS

| 2017/0010465 A1 | 1/2017 | Martinez et al. |
| 2018/0024373 A1* | 1/2018 | Joseph .................. G02B 30/56 359/629 |

(Continued)

FOREIGN PATENT DOCUMENTS

| JP | 7-75136 A | 3/1995 |
| JP | 2015-40943 A | 3/2015 |

(Continued)

OTHER PUBLICATIONS

International Search Report (PCT/ISA/210) dated Aug. 18, 2020, issued by the International Searching Authority in counterpart International Application No. PCT/JP2020/021993.

(Continued)

*Primary Examiner* — Wyatt A Stoffa
*Assistant Examiner* — Mitchell T Oestreich
(74) *Attorney, Agent, or Firm* — Sughrue Mion, PLLC (57) ABSTRACT

An image display device includes a first image projection unit configured to project a first image, a first beam splitter configured to split first projection light emitted from the first image projection unit into first transmitted light and first reflective light, a first retro-reflecting unit configured to cause the first reflective light to incident on the first beam splitter as first retro-reflective light, and a first image forming optical unit configured to form the first retro-reflective light transmitted through the first beam splitter into an image.

7 Claims, 9 Drawing Sheets

(58) Field of Classification Search
USPC .......................................................... 359/471
See application file for complete search history.

(56) References Cited

U.S. PATENT DOCUMENTS

| | | |
|---|---|---|
| 2019/0033699 A1 | 1/2019 | Iigahama et al. |
| 2020/0183183 A1 | 6/2020 | Oyama |

FOREIGN PATENT DOCUMENTS

| | | |
|---|---|---|
| JP | 2018-31925 A | 3/2018 |
| JP | 2018-118669 A | 8/2018 |
| JP | 2018-528446 A | 9/2018 |
| WO | 2017/179110 A1 | 10/2017 |
| WO | 2018/123686 A1 | 7/2018 |

OTHER PUBLICATIONS

Written Opinion (PCT/ISA/237) dated Aug. 18, 2020, issued by the International Searching Authority in counterpart International Application No. PCT/JP2020/021993.

\* cited by examiner

IMAGE DISPLAY DEVICE

TECHNICAL FIELD

The present disclosure relates to an image display device, and particularly relates to an image display device that displays an image in the air.

BACKGROUND ART

In the related art, an instrument panel for lighting and displaying an icon is used as a device for displaying various kinds of information in a vehicle. Accompanying with an increase in an amount of information to be displayed, an image display device may be embedded in the instrument panel, or the entire instrument panel may be implemented by the image display device.

The instrument panel is located below a windshield of the vehicle. When a driver visually recognizes information displayed on the instrument panel, the driver needs to move the line of sight downward during driving, which is not preferable. Therefore, a head up display (hereinafter, referred to as HUD) that projects an image on a windshield so that the driver can read information when the driver visually recognizes a front side of the vehicle has been proposed (for example, see Patent Literature 1). In such a HUD, an optical device that projects an image over a wide range of the windshield is required, and it is desired to reduce a size and a weight of the optical device.

There is a head mounted HUD in a form of glasses serving as an image display device that projects light using a small optical device (see Patent Literature 2, for example). The head mounted HUD directly irradiates eyes of a user with light emitted from a light source to project an image on the retina of the user.

CITATION LIST

Patent Literature

Patent Literature 1: JP-A-2018-118669
Patent Literature 2: JP-T-2018-528446

SUMMARY OF INVENTION

Technical Problem

In the head mounted HUD disclosed in the related art, a display position of the image is limited in the field of view, and it is difficult to display various kinds of information for each region. In addition, a distance of the image to be visually recognized is also fixed. It is not possible to display a plurality of images in the depth direction and it is not possible to perform complicated display such as changing a display position of an image to be visually recognized in the air.

The present disclosure has been made in view of the above problems in the related art, and an object of the present disclosure is to provide an image display device that can display a plurality of images in a depth direction.

Solution to Problem

In order to solve the above problems, there is provided an image display device. The image display device includes a first image projection unit configured to project a first image, a first beam splitter configured to split first projection light emitted from the first image projection unit into first transmitted light and first reflective light, a first retro-reflecting unit configured to cause the first reflective light to incident on the first beam splitter as first retro-reflective light, and a first image forming optical unit configured to form the first retro-reflective light transmitted through the first beam splitter into an image.

In such an image display device according to the present disclosure, the first projection light is split into the first reflective light and the first transmitted light by the first beam splitter, and the first reflective light becomes the first retro-reflective light and is formed into an image by the first image forming optical unit, so that an image can be formed at a position different from an image formed by the first transmitted light, and a plurality of images can be displayed in the depth direction.

According to an aspect of the present disclosure, the image display device further includes a second image projection unit configured to project a second image, a second beam splitter configured to split second projection light emitted from the second image projection unit into second transmitted light and second reflective light, a second retro-reflecting unit configured to cause the second reflective light to incident on the second beam splitter as second retro-reflective light, and a second image forming optical unit configured to form the second retro-reflective light transmitted through the second beam splitter into an image.

According to another aspect of the present disclosure, the second beam splitter reflects the first transmitted light toward the second image forming optical unit, and the first beam splitter reflects the second transmitted light toward the first image forming optical unit.

According to another aspect of the present disclosure, the image display device further includes a cylindrical lens provided between the first beam splitter and the second beam splitter, and the cylindrical lens transmits the first transmitted light and the second transmitted light.

According to another aspect of the present disclosure, the image display device further includes a first polarizer configured to polarize the first projection light in a first direction, and a second polarizer configured to polarize the second projection light in a second direction orthogonal to the first direction.

According to another aspect of the present disclosure, the image display device further includes a third light source unit configured to project a third image, a waveguide unit configured to guide third projection light emitted from the third light source unit, a light emitting unit configured to emit the third projection light to an outer side of the waveguide unit, and a dielectric multilayer film reflecting plate configured to reflect light passing through the first image forming optical unit, in which a position where the retro-reflective light is formed into an image and a position where the third projection light is formed into an image are different from each other.

According to another aspect of the present disclosure, the image display device further includes a reflecting plate driving unit configured to rotationally drive the dielectric multilayer film reflecting plate.

According to another aspect of the present disclosure, the image display device further includes a unit driving portion configured to change a relative position between the first image forming optical unit and the dielectric multilayer film reflecting plate.

Advantageous Effects of Invention

The present disclosure can provide an image display device that can display a plurality of images in a depth direction.

DESCRIPTION OF EMBODIMENTS

First Embodiment

Figure 1A:
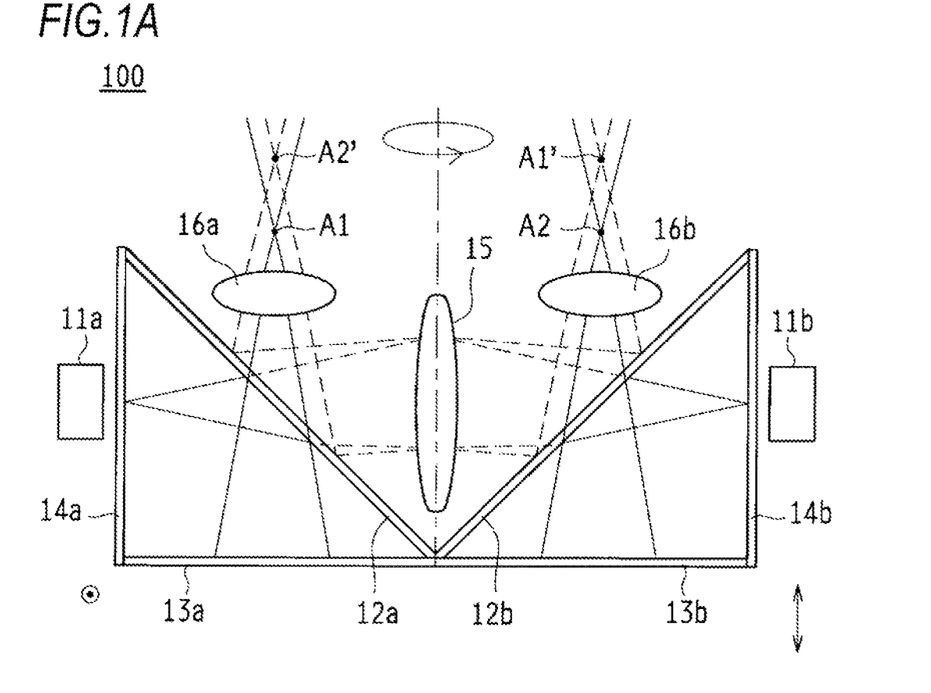
FIG. 1A is a schematic diagram showing an outline of an image display device 1W according to a first embodiment, and is a top view showing the image display device 100.
Figure 1B:
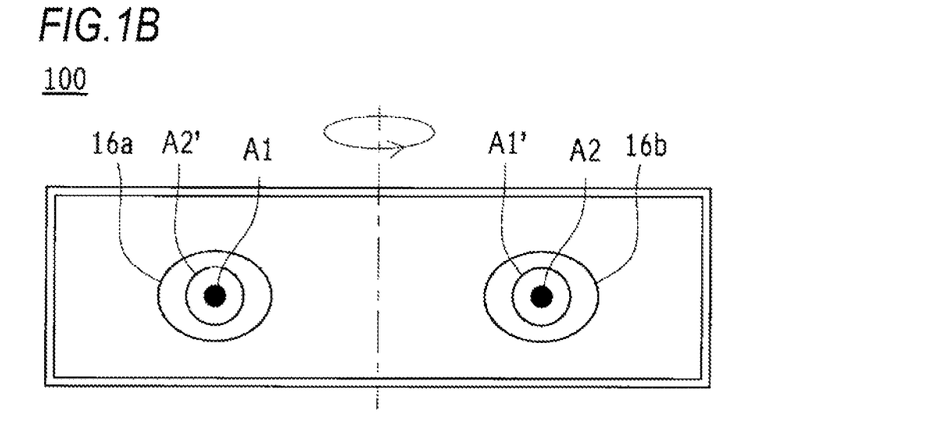
FIG. 1B is a schematic diagram showing an outline of the image display device 100 according to the first embodiment, and is a front view showing the image display device 100.

Hereinafter, embodiments of the present disclosure will be described in detail with reference to the drawings. The same or equivalent components, members, and processings shown in the drawings are denoted by the same reference numerals, and repeated description thereof will be omitted as appropriate. FIGS. 1A and 1B are schematic diagrams showing an outline of an image display device 100 according to the present embodiment, FIG. 1A is a top view, and FIG. 1B is a front view. As shown in FIGS. 1A and 1B, the image display device 100 includes image projection units 11a and 11b, beam splitters 12a and 12b, retro-reflecting units 13a and 13b, polarizers 14a and 14b, a cylindrical lens 15, and image forming lenses 16a and 16b.

The image projection units 11a and 11b are devices that emit light for forming images (a first image and a second image), and respectively project images for the right eye and the left eye. In FIGS. 1A and 1B, the image projection units 11a and 11b emit lights in opposite directions, and are disposed in a manner of facing each other. The configuration of the image projection units 11a and 11b is not limited, and a liquid crystal display device including backlight, a self-luminous organic EL display device, a projector device using a light source and a modulation element, or the like may be used. The images projected by the image projection units 11a and 11b may be still images or moving images. The images projected by the image projection units 11a and 11b may be the same or may be different.

The beam splitters 12a and 12b are members that transmit a part of incident light and reflect the other part of the incident light. The beam splitters 12a and 12b may be partial reflecting plates on which a film for adjusting reflectance is formed on a surface of a transparent plate. Transmittance and reflectance of light at the beam splitters 12a and 12b may be set in any balance. In the present embodiment, for example, the transmittance is set to 50%, and the reflectance is set to 50%. The beam splitters 12a and 12b are respectively disposed in a manner of forming an angle of 45 degrees relative to an optical axis of light emitted from the image projection units 11a and 11b, and are disposed in a manner of being orthogonal to each other. Although an example is described in which inclination angles of the beam splitters 12a and 12b are 45 degrees and the beam splitters 12a and 12b are orthogonal to each other in the present embodiment, the beam splitters 12a and 12b may be arranged at appropriate angles based on a relationship between a light emitting direction from the image projection units 11a and 11b and an image forming position of an image.

The retro-reflecting units 13a and 13b are optical members that reflect incident light in a direction opposite to an incident direction while maintaining a light converging property. The retro-reflecting units 13a and 13b may be a retro-reflecting plate having a structure in which fine glass beads are spread on a surface side of a reflective film or a structure of a prism. The retro-reflecting units 13a and 13b may be separate retro-reflecting plates, or may share a single retro-reflecting plate.

The polarizers 14a and 14b are polarizing plates that are respectively disposed between the image projection units 11a and 11b and the beam splitters 12a and 12b, and determine polarization directions of light emitted from the image projection units 11a and 11b. The polarization directions of the polarizer 14a and the polarizer 14b are orthogonal to each other, and for example, the polarizer 14a polarizes light in a direction perpendicular to the drawing, and the polarizer 14b polarizes light in an upper-lower direction in the drawing.

The cylindrical lens 15 is an optical member that transmits light incident from one surface and converges the light at an opposite side. As shown in FIGS. 1A and 1B, the cylindrical lens 15 is disposed at the center of the image display device 10N and is disposed in a manner of being perpendicular to the optical axis of light emitted from the image projection units 11a and 11b.

The image forming lenses 16a and 16b are optical members for forming light incident from the beam splitters 12a and 12b into images at predetermined positions in a space, and correspond to image forming optical units in the present disclosure.

In FIG. 1A, solid lines drawn from the image projection units 11a and 11b to the beam splitters 12a and 12b indicate paths of image projection lights emitted by the image projection units 11a and 11b. Solid lines drawn from the beam splitters 12a and 12b to the retro-reflecting units 13a and 13b indicate paths of reflective lights reflected by the beam splitters 12a and 12b and paths of retro-reflective lights reflected by the retro-reflecting units 13a and 13b. Solid lines passing through the image forming lenses 16a and 16b from the beam splitters 12a and 12b indicate paths of transmitted retro-reflective lights transmitted through the beam splitters 12a and 12b.

Broken lines that pass through the cylindrical lens 15 from the beam splitters 12a and 12b respectively and reach the beam splitters 12b and 12a at an opposite side indicate paths of transmitted lights transmitted through the beam splitters 12a and 12b. Broken lines passing through the image forming lenses 16a and 16b from the beam splitters 12a and 12b indicate paths of transmitted reflective lights reflected by the beam splitters 12a and 12b.

As shown in FIGS. 1A and 1B, projection light emitted from the image projection units 11a and 11b travels as reflective light, retro-reflective light, transmitted light, transmitted retro-reflective light, and transmitted reflective light, and forms images A1, A2, A1', and A2' at predetermined positions in the space. In the example shown in FIGS. 1A and 1B, the images A1 and A2' are displayed at the right eye side in a superimposed manner, and the images A2 and A1' are displayed at the left eye side in a superimposed manner.

Figure 2A:
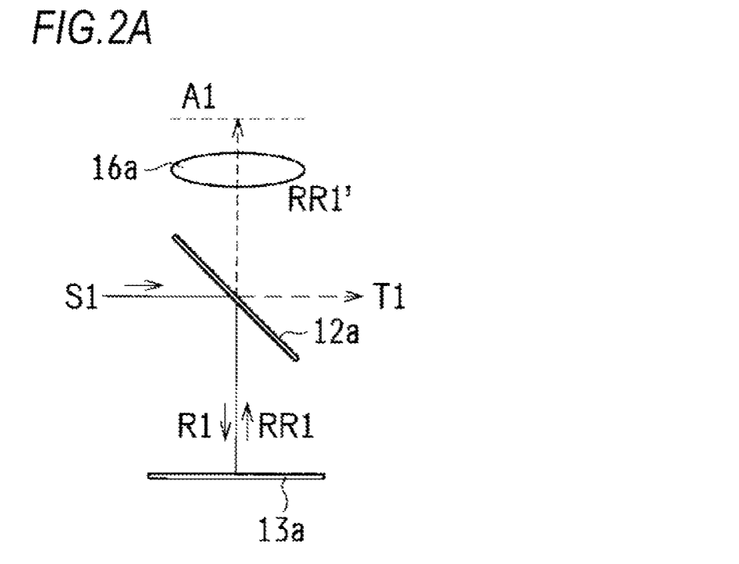
FIG. 2A is a diagram showing display of an image in the air, and is a top view showing a light path of a first image A1.
Figure 2B:
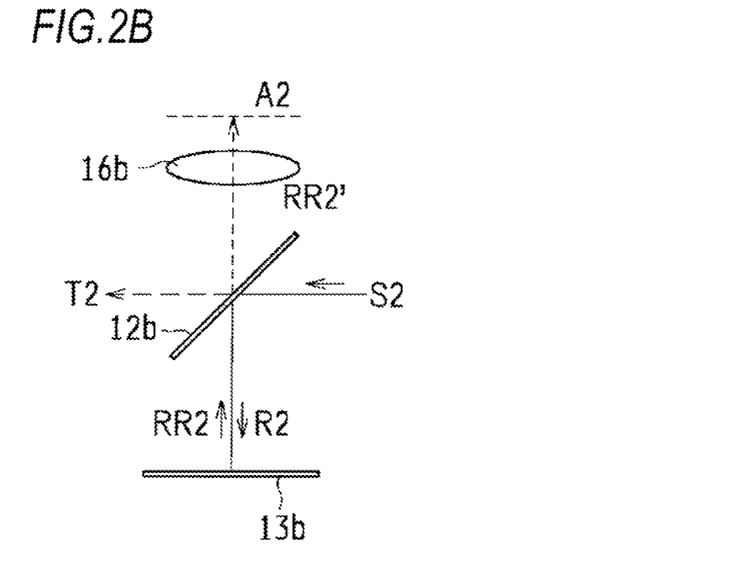
FIG. 2B is a diagram showing display of an image in the air, and is a top view showing a light path of a second image A2.
Figure 2C:
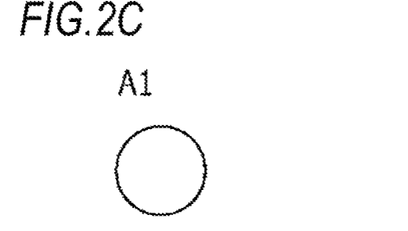
FIG. 2C is a diagram showing display of an image in the air, and is a front view showing an appearance of the first image A1.
Figure 2D:
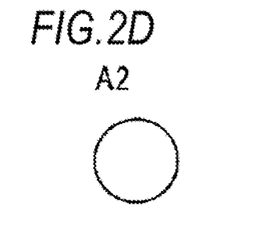
FIG. 2D is a diagram showing display of an image in the air, and is a front view showing an appearance of the second image A2.

FIGS. 2A, 2B, 2C, and 2D are diagrams showing display of images in the air. FIG. 2A is a top view showing a light path of the image A1. FIG. 2B is a top view showing a light path of the image A2. FIG. 2C is a front view showing an appearance of the image A1. FIG. 2D is a front view showing an appearance of the image A2. In FIGS. 1A and 1B, an optical path including the spread of light is shown, but in FIGS. 2A to 2D, a traveling direction is shown by lines and arrows only for the sake of simplification. Members unnecessary for the description of the optical path are not shown or described.

As shown in FIG. 2A, a projection light S1 (a first projection light) emitted from the image projection unit 11a (a first image projection unit) travels toward the beam splitter 12a (a first beam splitter) and is incident on one surface of the beam splitter 12a. A part of the projection light S1 is reflected by the beam splitter 12a and travels toward the retro-reflecting unit 3a (a first retro-reflecting unit) as a reflective light R1 (a first reflective light), and the other part of the projection light S1 is transmitted through the beam splitter 12a and travels in an extension direction of the projection light S1 as a transmitted light T1 (a first transmitted light). The reflective light R1 that reached the retro-reflecting unit 13a as a first retro-reflective light is reflected by the retro-reflecting unit 13a in a direction opposite to an incident direction. A retro-reflective light RR1 reaches the beam splitter 12a again, and then is transmitted through the beam splitter 12a. The retro-reflective light RR1 passes through the image forming lens 16a (a first image forming optical unit) as a transmitted retro-reflective light RR1', and forms the image A1 in the space. Although the reflective light R1 (the first reflective light) reflected by the beam splitter 12a travels toward the retro-reflecting unit 13a (the first retro-reflecting unit) in the present embodiment, a traveling direction of the reflective light R1 is not limited to the direction toward the retro-reflecting unit 13a. Another optical member may be disposed between the beam splitter 12a and the retro-reflecting unit 13a, and the reflective light R1 may finally reach the retro-reflecting unit 13a.

Similarly, as shown in FIG. 2B, a projection light S2 (a second projection light) emitted from the image projection unit 11b (a second image projection unit) travels toward the beam splitter 12b (a second beam splitter) and is incident on one surface of the beam splitter 12b. A part of the projection light S2 is reflected by the beam splitter 12b and travels toward the retro-reflecting unit 13b (a second retro-reflecting unit) as a reflective light R2 (a second reflective light), and the other part of the projection light S2 is transmitted through the beam splitter 12b and travels in an extension direction of the projection light S2 as a transmitted light T2 (a second transmitted light). The reflective light R2 that reached the retro-reflecting unit 13b as a second retro-reflective light is reflected by the retro-reflecting unit 13b in a direction opposite to an incident direction and serves as a retro-reflective light RR2. The retro-reflective light RR2 reaches the beam splitter 12b again, and then is transmitted through the beam splitter 12b. The retro-reflective light RR2 passes through the image forming lens 16b (a second image forming optical unit) as a transmitted retro-reflective light RR2', and forms the image A2 in the space.

As shown in FIG. 2C and FIG. 2D, the image A1 is formed at the right eye side by the projection light S1 emitted from the image projection unit 11a, and the image A2 is formed at the left eye side by the projection light S2 emitted from the image projection unit 11b. Here, when the image forming lenses 16a and 16b are not provided and the respective members are disposed such that optical path lengths of the projection lights S1 and S2, the reflective lights R1 and R2, the retro-reflective lights RR1 and RR2, and the transmitted retro-reflective lights RR1' and RR2' up to when the images A1 and A2 are formed are equal to one another, the images A1 and A2 are visually recognized at the same position in the air at the right eye side and the left eye side. Conversely, when emission positions of the projection lights S1 and S2 are moved in the upper-lower direction in the drawing so that optical path lengths are different from one another, the images A1 and A2 are visually recognized at different positions in the air at the right eye side and the left eye side. Further, when positions of the image forming lenses 16a and 16b are moved in the upper-lower direction in the drawing, the images A1 and A2 are also visually recognized at different positions in the air at the right eye side and the left eye side.

Figure 3A:
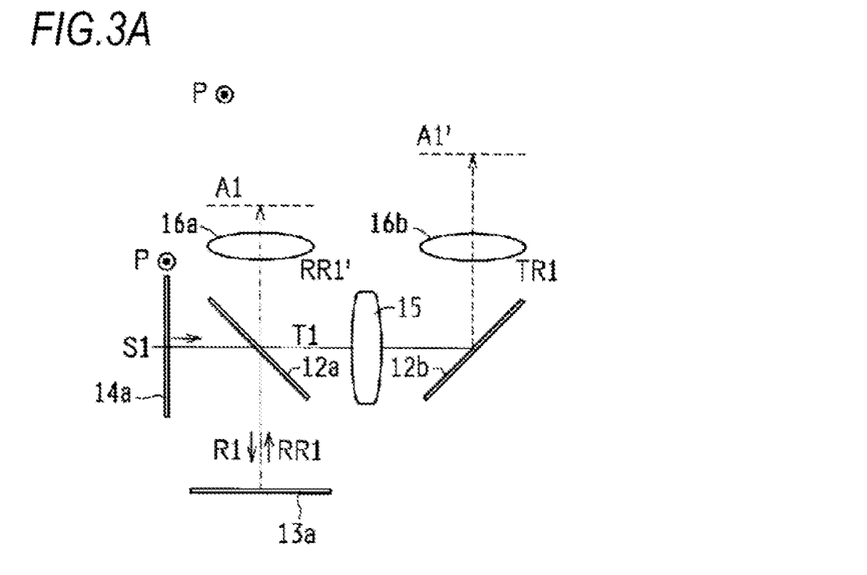
FIG. 3A is a diagram showing display of images in the air by transmitted lights T1 and T2 transmitted through beam splitters 12a and 12b, and is a top view showing light paths of images A1 and A1'.
Figure 3B:
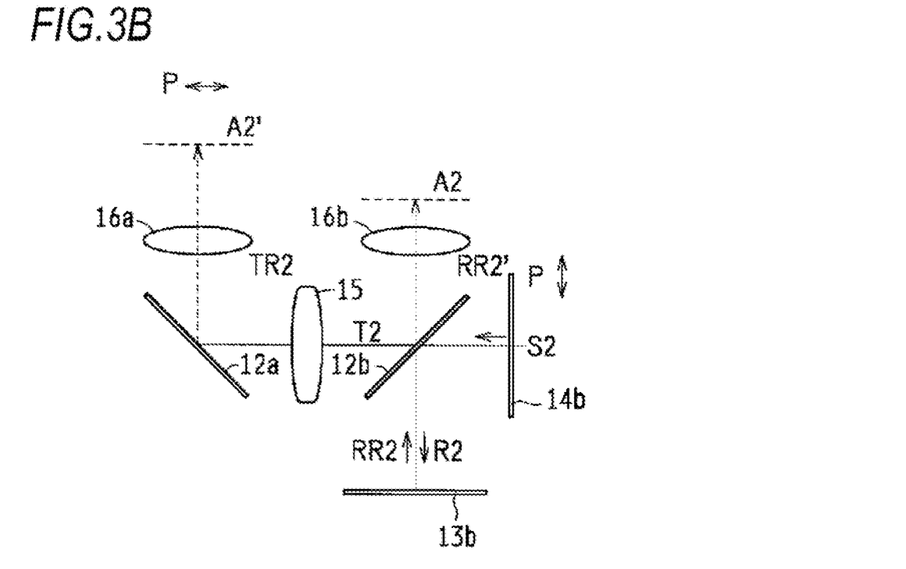
FIG. 3B is a diagram showing display of images in the air by the transmitted lights T1 and T2 transmitted through the beam splitters 12a and 12b, and is a top view showing light paths of images A2 and A2'.
Figure 3C:
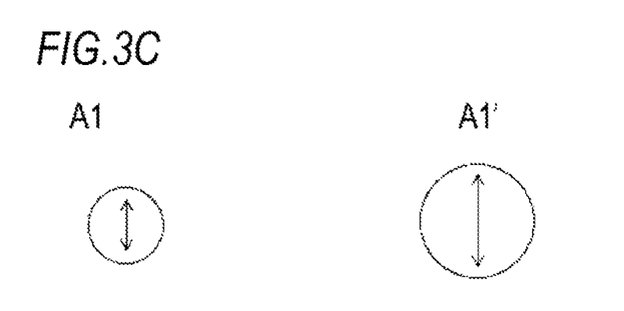
FIG. 3C is a diagram showing display of images in the air by the transmitted lights T1 and T2 transmitted through the beam splitters 12a and 12b, and is a front view showing appearances of the images A1 and A1'.
Figure 3D:
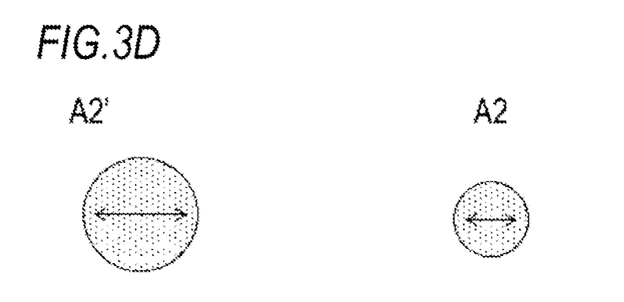
FIG. 3D is a diagram showing display of images in the air by the transmitted lights T1 and T2 transmitted through the beam splitters 12a and 12b, and is a front view showing appearances of the images A2 and A2'.

FIGS. 3A, 3B, 3C, and 3D are diagrams showing display of images in the air by the transmitted light T1 and T2 transmitted through the beam splitters 12a and 12b. FIG. 3A is a top view showing light paths of the images A1 and A1'. FIG. 3B is a top view showing light paths of the images A2 and A2'. FIG. 3C is a front view showing appearances of the images A1 and A1'. FIG. 3D is a front view showing appearances of the images A2 and A2'.

As shown in FIG. 3A, of the projection light S1 emitted from the image projection unit 11a, the transmitted light T1 transmitted through the beam splitter 12a is incident on the beam splitter 12b via the cylindrical lens 15 and is reflected as a transmitted reflective light TR1. The transmitted reflective light TR1 is formed into the image A1' in the space via the image forming lens 16b. At this time, since the polarizer 14a (a first polarizer) is disposed between the image projection unit 11a and the beam splitter 12a, polarization directions (first directions) of the images A1 and A1' is the same. Since the image A1' is formed via the cylindrical lens 15 and optical path lengths from the image projection unit 11a are different, the images A1 and A1' are visually recognized at different depths at the right eye side and the left eye side. Both the images A1 and A1' are emitted from the image projection unit 11a, display contents are the same, and the images are inverted.

Similarly, as shown in FIG. 3B, of the projection light S2 emitted from the image projection unit 1b, the transmitted light T2 transmitted through the beam splitter 12b is incident on the beam splitter 12a via the cylindrical lens 15 and is reflected as a transmitted reflective light TR2. The transmitted reflective light TR2 is formed into the image A2' in the space via the image forming lens 16a. At this time, since the polarizer 14b (a second polarizer) is disposed between the image projection unit 11b and the beam splitter 12b, polarization directions (second directions) of the images A2 and A2' is the same. Since the polarization directions of the polarizers 14a and 14b are orthogonal to each other, the polarization directions of the images A1 and A1' and the polarization directions of the images A2 and A2' are also orthogonal to each other. Since the image A2' is displayed via the cylindrical lens 15 and optical path lengths from the image projection unit 11b are different, the images A2' and A2 are visually recognized at different depths at the right eye side and the left eye side. Both the images A2 and A2' are emitted from the image projection unit 11b, display contents are the same, and the images are inverted.

Figure 4:
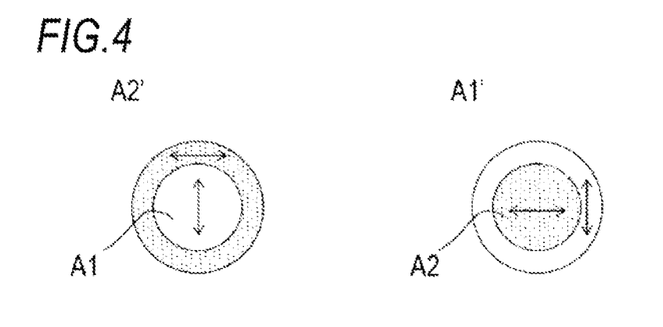
FIG. 4 is a diagram schematically showing an overlap between the images A1 and A2' at a right eye side and an overlap between the images A2 and A1 at a left eye side.

FIG. 4 is a diagram schematically showing an overlap between the images A1 and A2' at the right eye side and an overlap between the images A2 and A1' at the left eye side. In the example of the polarizers 14a and 14b shown in FIGS. 3A to 3D, the image A1 polarized in the upper-lower direction in the drawing and the image A2' polarized in a left-right direction in the drawing can be visually recognized as overlapping with each other at different depths at the right eye side. The image A2 polarized in the left-right direction in the drawing and the image A1' polarized in the upper-lower direction in the drawing can be visually recognized as overlapping with each other at different depths at the left eye side.

Accordingly, the polarizers 14a and 14b are mechanisms for switching polarization directions, and the images A1 and A2' and the images A2 and A1' can be selectively displayed by disposing another polarizer in front of eyes of a user. Since light having different polarization directions can be blocked, noise light can be removed and noises in an image formed in the air can be removed.

Although an example in which the images A1, A2', A2, and A1' are displayed at the right eye side and the left eye side is shown in FIGS. 1A, 1B, and 3A to 3D, a light shielding plate or the like may be disposed at one of the image forming lenses 16a and 16b, and two images may be superimposed only at the other eye side. Alternatively, a reflecting plate may be combined with the cylindrical lens 15 to reflect the transmitted light T1 or T2 toward the cylindrical lens 15 again to form the image A1, A1' or A2, A2' at one eye side.

As described above, in the image display device 100 according to the present embodiment, the projection lights S1 and S2 are split into the reflective lights R1 and R2 and the transmitted lights T1 and T2 by the beam splitters 12a and 12b, and the reflective lights R1 and R2 becomes the retro-reflective lights RR1 and RR2 and are formed into images by the image forming lenses 16a and 16b. Therefore, the image A1 and A2 can be displayed at different positions from the images A1' and A2', and a plurality of images can be displayed in the depth direction.

Second Embodiment

Figure 5A:
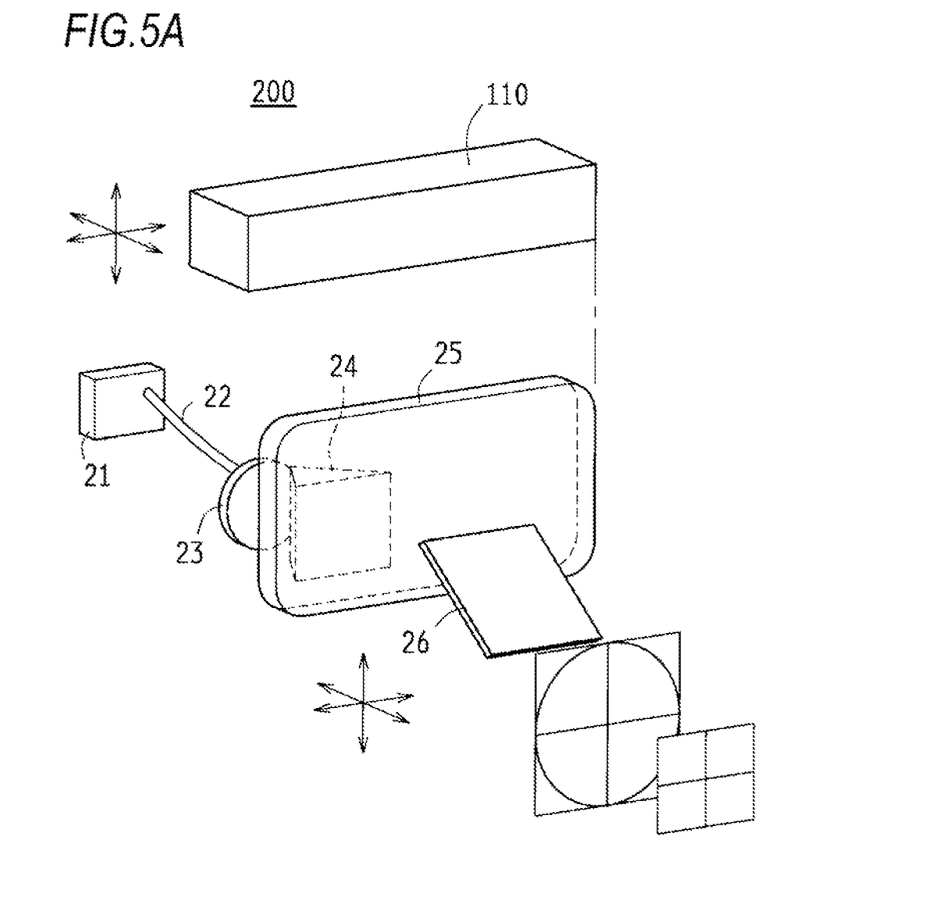
FIG. 5A is a perspective view schematically showing an outline of an image display device 200 according to a second embodiment, and shows an example in which a dielectric multilayer film reflecting plate 26 is disposed far from a light guide plate unit 25.
Figure 5B:
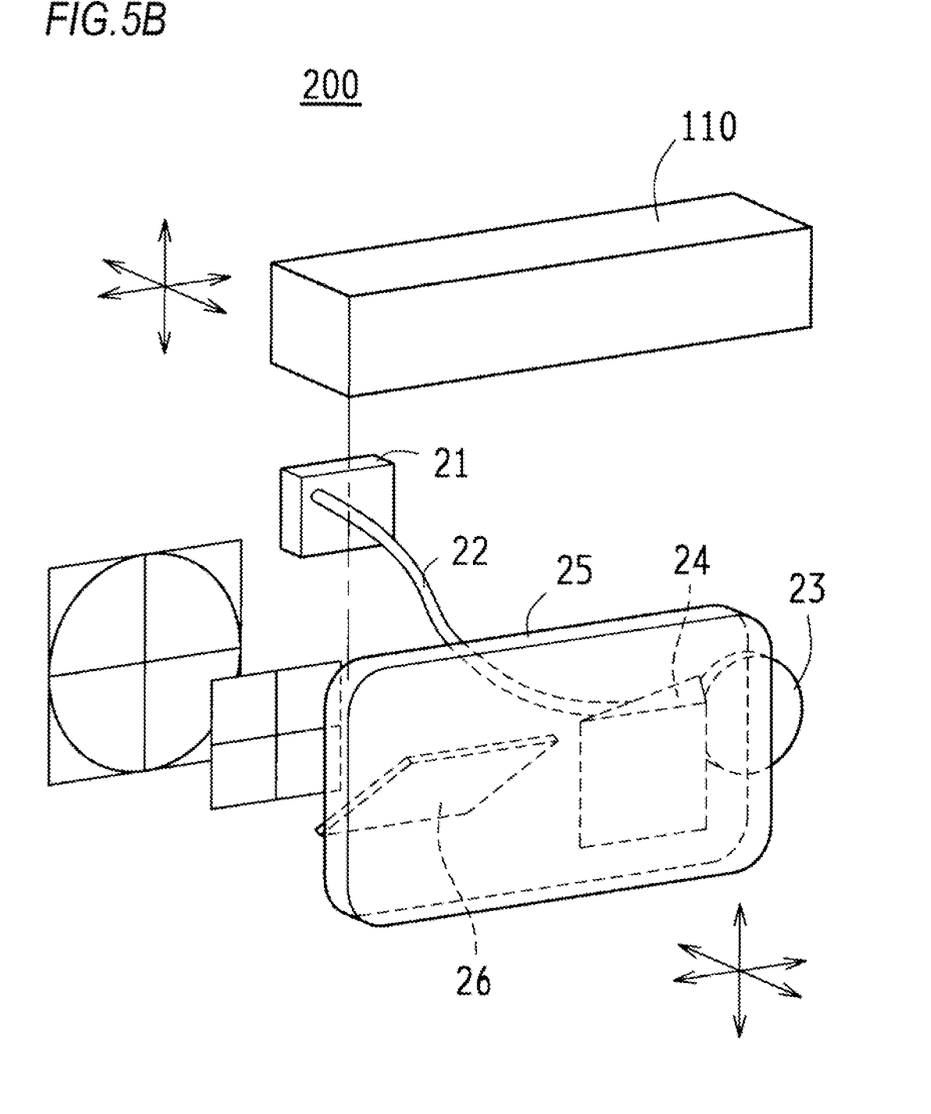
FIG. 5B is a perspective view schematically showing an outline of the image display device 200 according to the second embodiment, and shows an example in which the dielectric multilayer film reflecting plate 26 is disposed near the light guide plate unit 25.

Next, a second embodiment of the present disclosure will be described with reference to FIGS. 5A to 7B. The description of the same contents as those of the first embodiment will be omitted. FIGS. 5A and 5B are perspective views schematically showing an outline of an image display device 200 according to the present embodiment. FIG. 5A shows an example in which a dielectric multilayer film reflecting plate 26 is disposed far from the light guide plate unit 25. FIG. 5B shows an example in which the dielectric multilayer film reflecting plate 26 is disposed near the light guide plate unit 25.

As shown in FIGS. 5A and 5B, the image display device 200 according to the present embodiment includes a unit driving portion 110, a light source unit 21 (a third light source unit), a fiber unit 22, a lens 23, a prism 24, the light guide plate unit 25 (a waveguide unit), and the dielectric multilayer film reflecting plate 26.

The unit driving portion 110 is a device that includes a projection unit provided with a light source or an optical system that displays an image in a space, and includes a driving unit that three-dimensionally moves the projection unit. A structure of the unit driving portion 110 is not limited, and for example, the image display device 100 described in the first embodiment may be used as the projection unit in which the driving unit such as a motor is accommodated in a housing. As shown in FIGS. 5A and 5B, the unit driving portion 110 is disposed above the light guide plate unit 25 and the dielectric multilayer film reflecting plate 26, and emits light to the dielectric multilayer film reflecting plate 26.

The light source unit 21 is a member that includes a semiconductor laser element and a package and emits light of a predetermined wavelength. The light source unit 21 projects an image (a third image). A specific configuration of the light source unit 21 is not limited, and a known CAN type or frame type package may be used. A second harmonic generation (SHG) element or the like may be mounted on the light source unit 21 to perform wavelength conversion. Wavelengths of light emitted from the light source unit 21 may be the same or may be different.

The fiber unit 22 is an optical element that guides light (a third projection light) emitted from the light source unit 21, and is implemented by an optical fiber having flexibility. An incident end face of the fiber unit 22 is disposed in a manner of facing the light source unit 21, and an emission end face of the fiber unit 22 is disposed in a manner of facing the lens 23.

The lens 23 is an optical element for adjusting a spread angle of light emitted from the fiber unit 22 and causing the light to incident on the prism 24 and a light incident portion of the light guide plate unit 25. A collimator lens may be used as the lens 23.

The prism 24 is an optical element having a triangular cross section and disposed in the vicinity of the light incident portion of the light guide plate unit 25 where light is incident. A gap is provided between the light guide plate unit 25 and the prism 24. A material of the prism 24 is not limited, and in order to cause light from the light source unit 21 to efficiently incident on the light guide plate unit 25, it is preferable that a refractive index of the prism 24 and a refractive index of the light guide plate unit 25 are substantially the same, and it is preferable that the prism 24 is made of the same material as that of the light guide plate unit 25.

The light guide plate unit 25 is a flat plate-shaped member made of a translucent material, and it is possible to see through one surface side of the light guide plate unit 25 to the other surface side. The prism 24 is disposed near the light incident portion at one end side of the light guide plate unit 25. A light emitting unit such as a half mirror and a hologram is formed inside the light guide plate unit 25 at a side opposite to the prism 24. Therefore, light traveling inside the light guide plate unit 25 is emitted to eyes of a user, and light traveling from a side opposite to the user is transmitted.

The dielectric multilayer film reflecting plate 26 is a plate-shaped member having a multilayer film in which dielectrics having different refractive indices are repeatedly stacked. The dielectric multilayer film reflecting plate 26 is an optical member that reflects light of a predetermined wavelength depending on a film thickness of a dielectric layer and transmits light of other wavelengths. Although not shown in FIGS. 5A and 5B, a reflecting plate driving unit that rotationally drives an angle of a reflective surface is attached to the dielectric multilayer film reflecting plate 26, and the reflecting plate driving unit can switch reflection directions of light in accordance with a control signal.

Figure 6A:
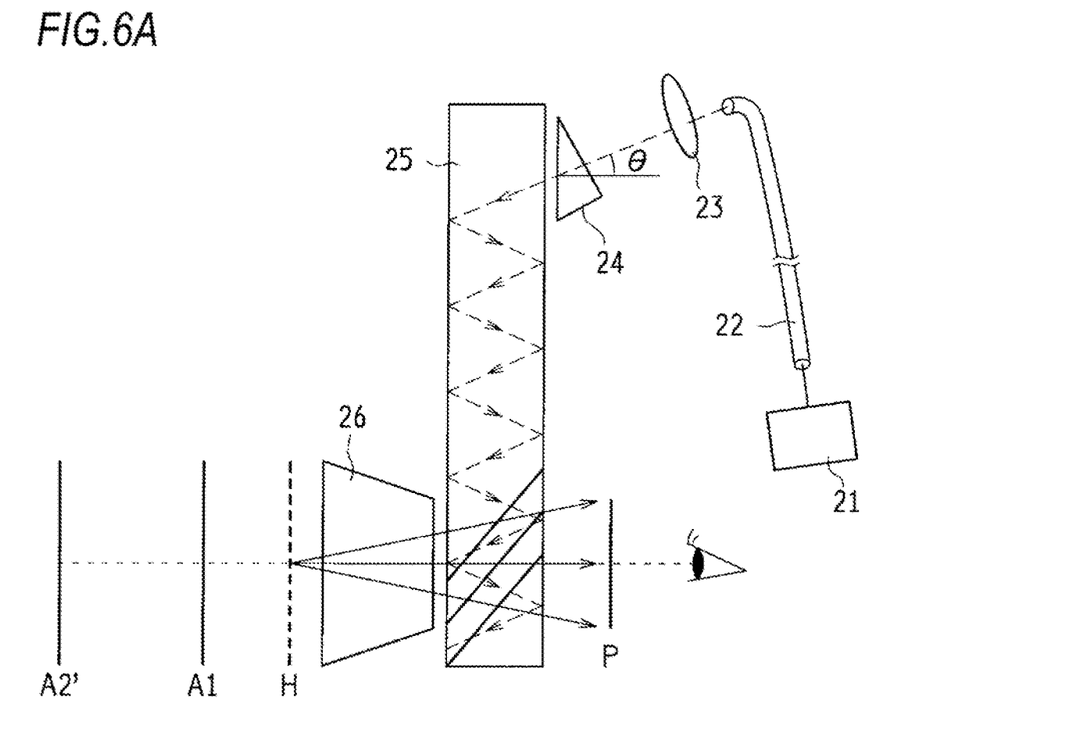
FIG. 6A is a top view schematically showing projection of images in the example shown in FIG. 5A.
Figure 6B:
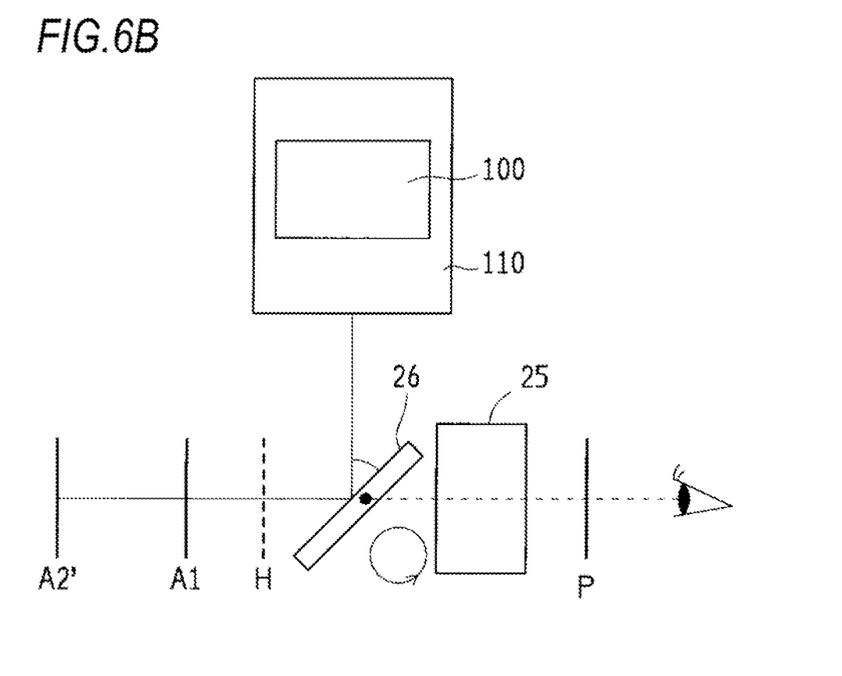
FIG. 6B is a side view schematically showing projection of images in the example shown in FIG. 5A.
Figure 7A:
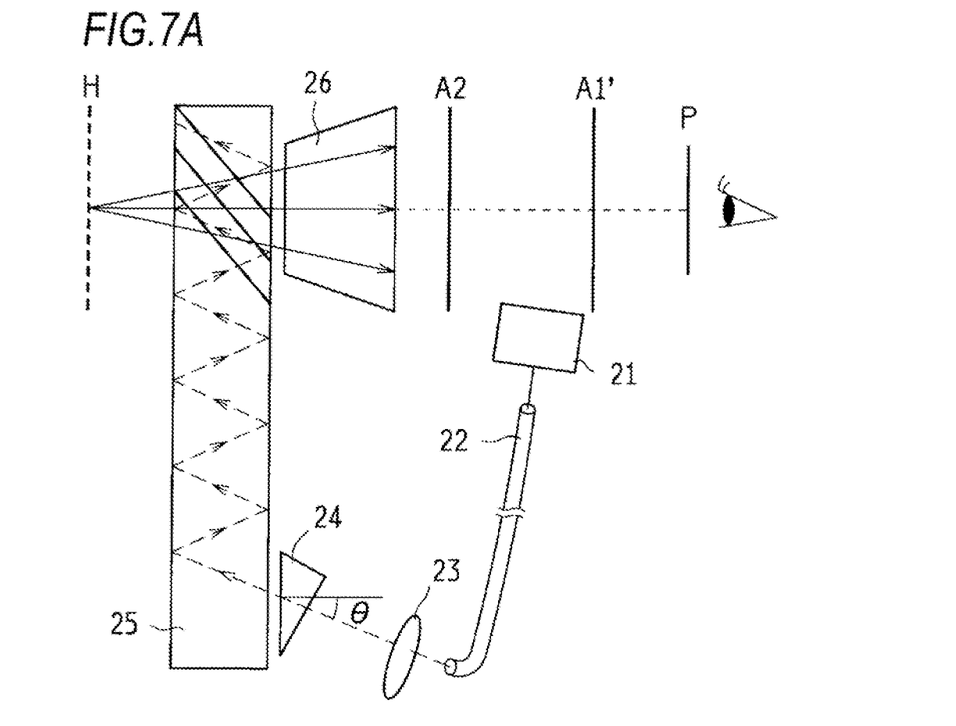
FIG. 7A is a top view schematically showing projection of images in the example shown in FIG. 5B.
Figure 7B:
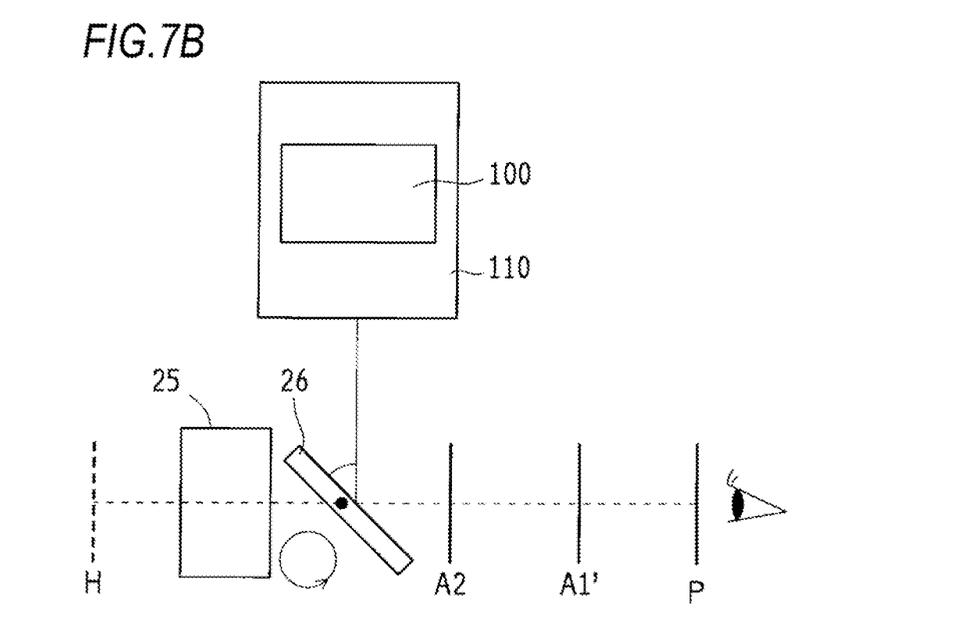
FIG. 7B is a side view schematically showing projection of images in the example shown in FIG. 5B.

FIGS. 6A and 6B are diagrams schematically showing projection of images in the example shown in FIG. 5A. FIG. 6A is a top view, and FIG. 6B is a side view. FIGS. 7A and 7B are diagrams schematically showing projection of images in the example shown in FIG. 5B. FIG. 7A is a top view, and FIG. 7B is a side view. FIGS. 6A and 6B show an example in which an angle of the dielectric multilayer film reflecting plate 26 is controlled such that the images A1 and A2' are displayed far from the light guide plate unit 25, and FIGS. 7A and 7B show an example in which the angle of the dielectric multilayer film reflecting plate 26 is controlled such that the images A2 and A1' are displayed near the light guide plate unit 25.

As shown in FIGS. 6A and 7A, in the image display device 200 according to the present embodiment, light emitted from the light source unit 21 is incident on the incident end surface of the fiber unit 22, and is incident on the light guide plate unit 25 from the emission end surface of the fiber unit 22 via the lens 23 and the prism 24. Inside the light guide plate unit 25, light is repeatedly reflected and reaches the light emitting unit, the light is emitted to a user side (in a projection direction) as an emitted light, the light is displayed as an image H in the air, and the light is visually recognized by superimposing a background transmitted through the light guide plate unit 25.

As shown in FIGS. 6B and 7B, light is emitted from the unit driving portion 110 toward the dielectric multilayer film reflecting plate 26 located below the unit driving portion 110, and the light is emitted in a direction corresponding to an inclination angle of the dielectric multilayer film reflecting plate 26 so as to display the images A1 and A2' and the images A2 and A1'. Here, when the image display device 100 according to the first embodiment is used as the projection unit accommodated in the unit driving portion 110, display positions of the images A1 and A2' and display positions of the images A2 and A1' in the air correspond to the optical path lengths described with reference to FIGS. 1A and 1B. Therefore, the image H projected from the light source unit 21 and the images A1 and A2' and the images A2 and A1' displayed by the unit driving portion 110 are superimposed and displayed at positions having different depths.

When a position of the projection unit (the image display device 100) is three-dimensionally moved in the unit driving portion 110, a path or an optical path length of the emitted light changes, and thus the display positions of the images A1 and A2' and the display positions of the images A2 and A1' also change. Accordingly, the images A1, A2', A2, and A1' can be displayed while changing relative positions between the images A1, A2', A2, and A1' and the image H or the background.

As shown in FIGS. 6A, 6B, 7A, and 7B, it is possible to select which one of the images A1 and A2' and the images A2 and A1' formed in the air is to be visually recognized by the user by providing a polarizer P for selecting a polarization direction of light transmitted in front of the eyes of the user.

Although FIGS. 6A, 6B, 7A, and 7B show examples respectively corresponding to examples of the right eye side and the left eye side, the examples may correspond to one of the right eye side and the left eye side. Even when the dielectric multilayer film reflecting plate 26 is disposed at one of a far side and a near side from the light guide plate unit 25, image forming positions of the images A1, A2, A1', and A2' can be switched by switching the inclination angle of the dielectric multilayer film reflecting plate 26.

As described above, in the image display device 200 according to the present embodiment, the image H projected by the light source unit 21 and the images A1, A2, A1', and A2' projected from the unit driving portion 110 are superimposed with one another, and a plurality of images can be formed in the depth direction. The image forming positions of the images A1, A2, A1', and A2' formed in the space can be changed.

Third Embodiment

Figure 8:
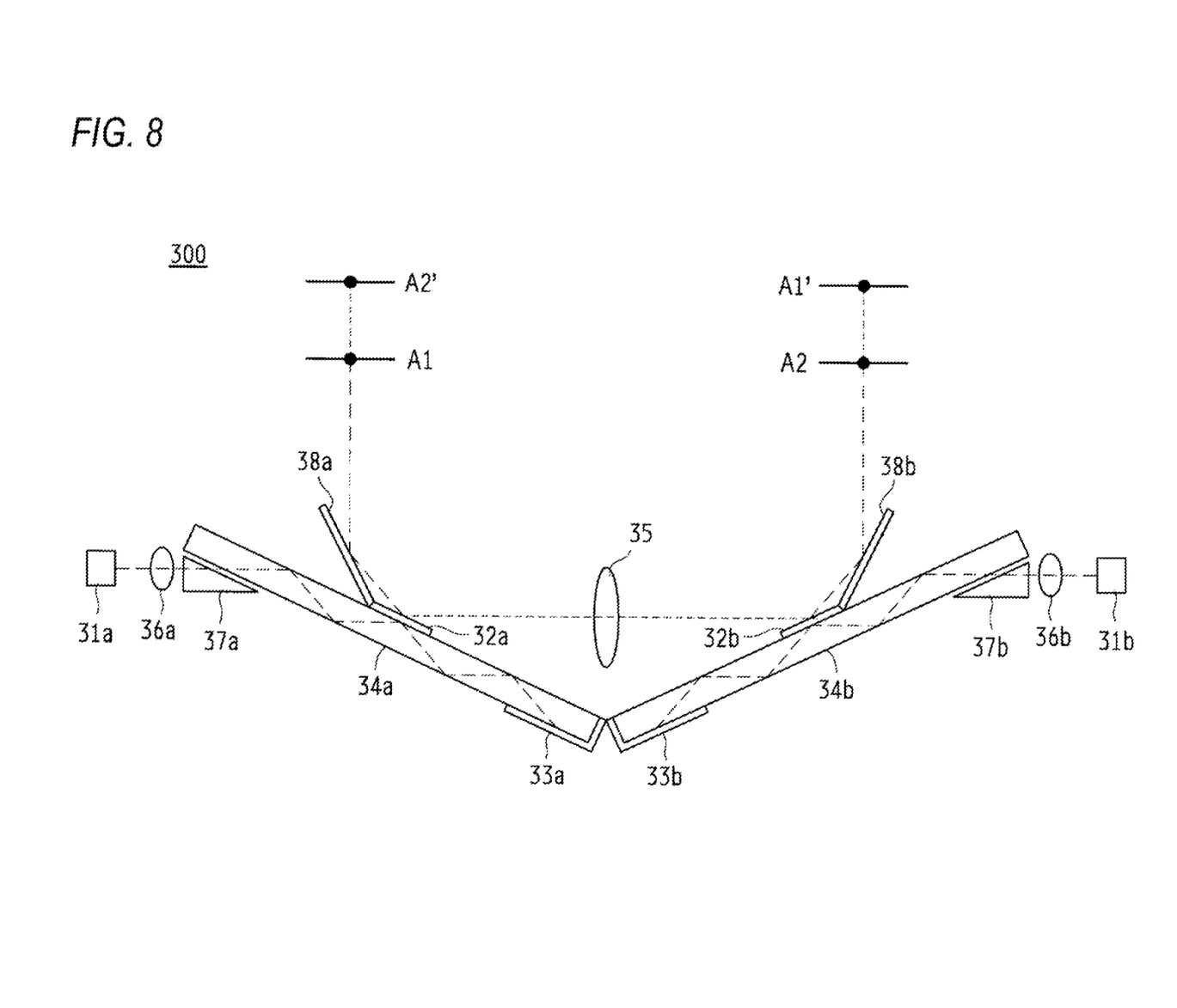
FIG. 8 is a schematic diagram showing an outline of an image display device 300 according to a third embodiment.

Next, a third embodiment of the present disclosure will be described with reference to FIG. 8. The description of the same contents as those of the first embodiment will be omitted. FIG. 8 is a schematic diagram showing an outline of an image display device 300 according to the present embodiment. As shown in FIG. 8, the image display device 300 includes image projection units 31*a* and 31*b*, beam splitters 32*a* and 32*b*, retro-reflecting units 33*a* and 33*b*, light guide plate units 34*a* and 34*b*, a cylindrical lens 35, lenses 36*a* and 36*b*, prisms 37*a* and 37*b*, and mirrors 38*a* and 38*b*.

In the image display device 300 according to the present embodiment, projection lights emitted from the image projection units 31*a* and 31*b* are incident on the light guide plate units 34*a* and 34*b* via the lenses 36*a* and 36 and the prisms 37*a* and 37*b*. In the light guide plate units 34*a* and 34*b*, lights are repeatedly reflected and are incident on the beam splitters 32*a* and 32*b*, a part of the lights is reflected by the beam splitters 32*a* and 32*b* and travels toward the retro-reflecting units 33*a* and 33*b* in the light guide plate units 34*a* and 34*b*, and a part of the lights is transmitted through the beam splitter 32a and travels toward the cylindrical lens 35. The light that reached the retro-reflecting units 33a and 33b is reflected in a direction opposite to an incident direction, is incident on the beam splitters 32a and 32b again, is transmitted through the beam splitters 32a and 32b, and then is reflected by the mirrors 38a and 38b to form the images A1 and A2.

The light that transmitted through the beam splitters 32a and 32b and reached the cylindrical lens 35 is reflected by the mirrors 38b and 38a at an opposite side to form the images A2' and A1'.

In the present embodiment as well, the projection light is split into the reflective light and the transmitted light by the beam splitters 32a and 32b, and the reflective light becomes the retro-reflective light and is formed into an image, so that the image display device 300 can display the images A1 and A2 at positions different from the positions of the images A1' and A2', and can form a plurality of images in the depth direction. A thickness and a weight of the image display device 3M) can be reduced by repeatedly reflecting light inside the light guide plate units 34a and 34b.

The present disclosure is not limited to the embodiments described above, various modifications can be made within the scope of the claims, and embodiments obtained by appropriately combining technical methods disclosed in different embodiments are also included in the technical scope of the present disclosure.

The present application claims priority from Japanese Patent Application No. 2019-105128 filed on Jun. 5, 2019, contents of which are incorporated by reference in its entirety.

The invention claimed is:

1. An image display device comprising:
a first image projection unit configured to project a first image;
a first beam splitter configured to split first projection light emitted from the first image projection unit into first transmitted light and first reflective light;
a first retro-reflecting unit that causes the first reflective light to be incident on the first beam splitter as first retro-reflective light;
a first image forming optical unit that forms the first retro-reflective light transmitted through the first beam splitter into an image;
a second image projection unit configured to project a second image;
a second beam splitter configured to split second projection light emitted from the second image projection unit into second transmitted light and second reflective light;
a second retro-reflecting unit that causes the second reflective light to be incident on the second beam splitter as second retro-reflective light; and
a second image forming optical unit that forms the second retro-reflective light transmitted through the second beam splitter into an image.

2. The image display device according to claim 1,
wherein the second beam splitter reflects the first transmitted light toward the second image forming optical unit, and
wherein the first beam splitter reflects the second transmitted light toward the first image forming optical unit.

3. The image display device according to claim 2, further comprising:
a cylindrical lens provided between the first beam splitter and the second beam splitter,
wherein the cylindrical lens transmits the first transmitted light and the second transmitted light.

4. The image display device according to claim 1, further comprising:
a first polarizer configured to polarize the first projection light in a first direction; and
a second polarizer configured to polarize the second projection light in a second direction orthogonal to the first direction.

5. An image display device comprising:
a first image projection unit configured to project a first image;
a first beam splitter configured to split first projection light emitted from the first image projection unit into first transmitted light and first reflective light;
a first retro-reflecting unit that causes the first reflective light to be incident on the first beam splitter as first retro-reflective light;
a first image forming optical unit that forms the first retro-reflective light transmitted through the first beam splitter into an image;
a second light source unit configured to project a second image;
a waveguide unit configured to guide second projection light emitted from the second light source unit;
a light emitting unit configured to emit the second projection light to an outer side of the waveguide unit; and
a dielectric multilayer film reflecting plate that reflects light passing through the first image forming optical unit,
wherein a position where the retro-reflective light is formed into an image and a position where the second projection light is formed into an image are different from each other.

6. The image display device according to claim 5, further comprising:
a reflecting plate driving unit configured to rotationally drive the dielectric multilayer film reflecting plate.

7. The image display device according to claim 5, further comprising:
a unit driving portion configured to change a relative position between the first image forming optical unit and the dielectric multilayer film reflecting plate.

* * * * *